INVENTOR.
GEORGE R. REED
BY Walter E. Pavlick
Harold D. Hall
Richard B Faley
ATTORNEYS Dec. 3, 1968  G. R. REED  3,414,096

AUTOMATIC AND MANUAL MEANS FOR HUB CLUTCH

Filed June 17, 1966  4 Sheets-Sheet 4

INVENTOR.
GEORGE R. REED
BY Walter E. Pavlick
Harold D. Hall
Richardson B. Farley
ATTORNEYS 3,414,096
AUTOMATIC AND MANUAL MEANS FOR HUB CLUTCH
George R. Reed, Lambertville, Mich., assignor to Dana Corporation, Toledo, Ohio, a corporation of Virginia
Filed June 17, 1966, Ser. No. 558,331
14 Claims. (Cl. 192—38)

ABSTRACT OF THE DISCLOSURE

An automatically and manually actuated hub lock is provided by the use of a roller engaging means disposed between an inner race secured to the axle and an outer race secured to the hub. The roller engaging means is mounted between the inner and outer races and has axially extending portions which contact manually or automatically actuated restraining means to urge the clutch into engaged positions. The restraining means and roller engaging means are both floatingly mounted to provide free play of the parts so that, upon actuation, there is positive alignment and mating engagement of the parts to insure positive and efficient clutch operation.

---

This invention relates to a hub clutch for use with a rotating hub such as found on the wheels of a vehicle, a pulley or the like, and more particularly, to a hub clutch mechanism with both an automatic and a manual engaging means, to alternately prevent or permit free wheeling of a hub such as the front wheel hub of a vehicle.

During the operation of four wheel drive vehicles, for example, it is usually desirable that the front wheels be free wheeling when not in driving relationship, that is, that these wheels be positively disconnected from the gearing and drive shaft to prevent undue wear of the rotating parts and uneconomical operation of the vehicle. Although automatic hub locking mechanisms have been developed, these devices are generally difficult to positively engage and disengage after extended use or after use under adverse driving conditions. It would be desirable, therefore, to provide an automatic hub clutching mechanism which is both positive acting and not as subject to jamming due to wear, corrosive conditions, misalignment at assembly, or the like.

However, automatically acting hub locks, it has been found, tend to free wheel due to overrun of the front wheels on extreme downgrades or uneven terrain so that it would also be advantageous to provide a manual hub lock usable in conjunction therewith, that overrides the automatic means for locked four wheel drive, when desired.

Accordingly, it is the object of the present invention to provide an improved automatic hub lock having a more positive clutching engagement when in driving relationship.

It is an additional object of the invention to provide an automatic hub lock which is operative in either direction of shaft rotation.

It is a further object of the invention to provide a hub lock having automatic alignment of the clutch parts so that surface to surface engagement occurs between the clutching parts.

It is another object of the invention to provide a clutch hub lock which has great durability and ruggedness under adverse driving conditions occasioned by snow, dirt or salted streets or highways.

It is a still further object of this invention to provide a manual hub lock that may be utilized in conjunction with an automatic hub lock to thereby prevent free wheeling due to overrun.

It is an additional object of this invention to provide a vehicle hub lock wherein a single locking means is utilized for both manual and automatic locking operation, thereby reducing the required number of elements and simplifying the hub lock assembly.

Other and further objects of this invention will be apparent from the following descriptions and claims, and may be understood by reference to the accompanying drawings which, by way of illustration, show a preferred embodiment of the invention and what is considered to be the best mode of applying the above principles.

In the preferred embodiment of this invention a roller engaging means is disposed between an inner race secured to the axle and an outer race secured to the hub. The roller engaging means is floatingly mounted between the inner and outer races and is provided with axially extending portions on opposite ends thereof which contact a manually or automatically actuated restraining means to urge the clutch into engaged position. Both restraining means are also floatingly mounted providing additional free play of the parts so that the clutch means, upon actuation, positively aligns and ensures mating engagement of the roller engaging means with the inner and outer races on the hub and axle, respectively. The manual restraining means is arranged so as to insure positive locking action to thereby override the automatic restraining means and any tendency of the device to free wheel.

Each of the races is composed of a series of annular grooves so that the rollers of the clutch, upon locking the shaft to the hub, are positively positioned in the grooves of the outer race, and grooves in the inner race which mate with the peripheral surface on the rollers to provide surface to surface contact therebetween.

Because of the floating arrangement of the restraining means and roller engaging means, the roller engaging means is forced into the aforementioned engagement under manual or automatic operation substantially independent of any deleterious effect upon the mechanism due to adverse operating conditions or misalignment of the parts upon assembly to thereby, positively lock the wheel hub to the shaft. Conversely, this arrangement also provides easy, positive declutching, since the rollers are forced into alignment and thereby positively positioned in the annular grooves of the inner races permitting free wheeling of the hub and its associated wheel.

Figure 1:
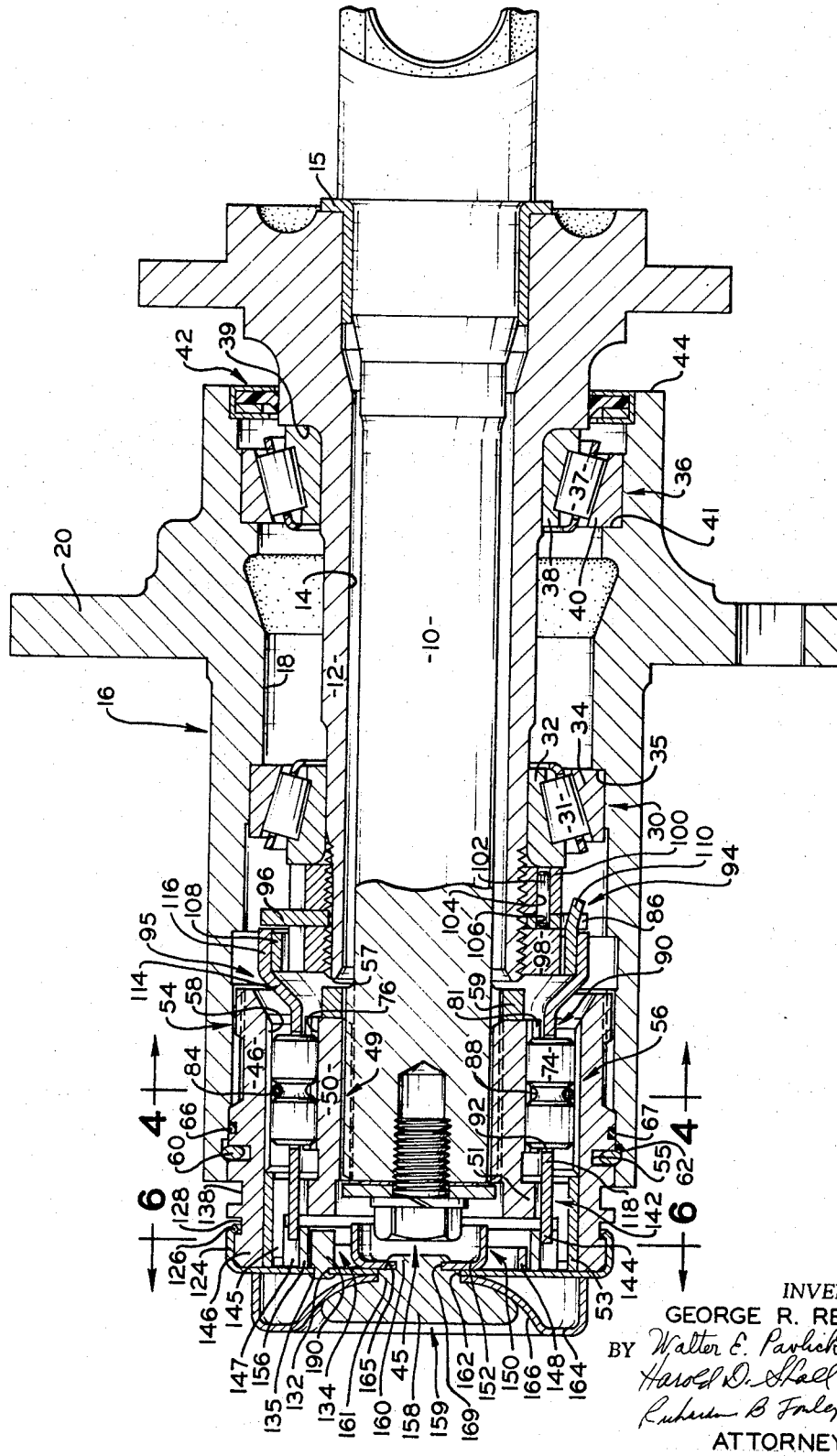
FIG. 1 is a longitudinal sectional view of a device incorporating this invention in a position of disengagement.
Figure 2:
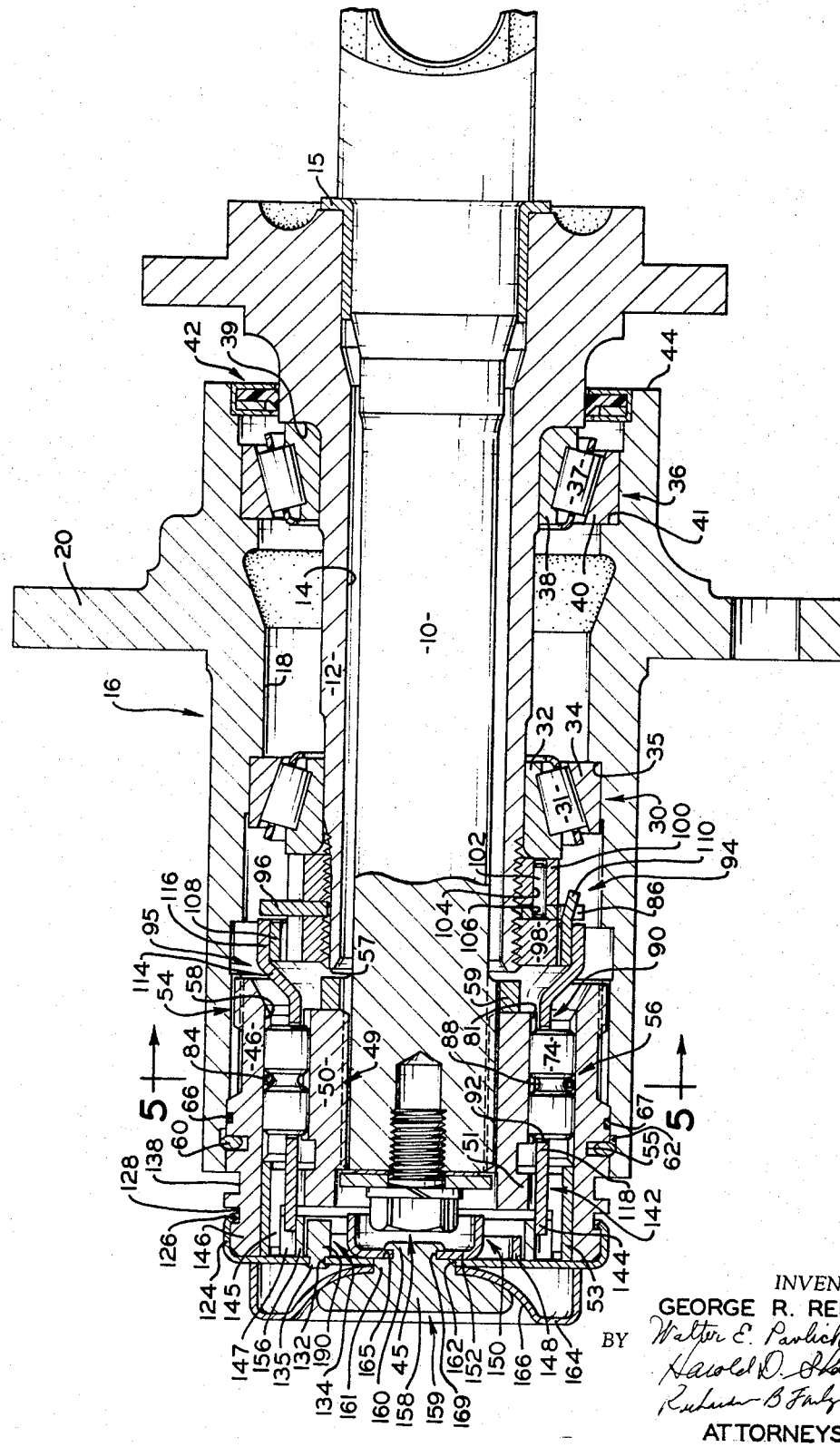
FIG. 2 is a view similar to FIG. 1, but showing the device in the engaged position.
Figure 3:
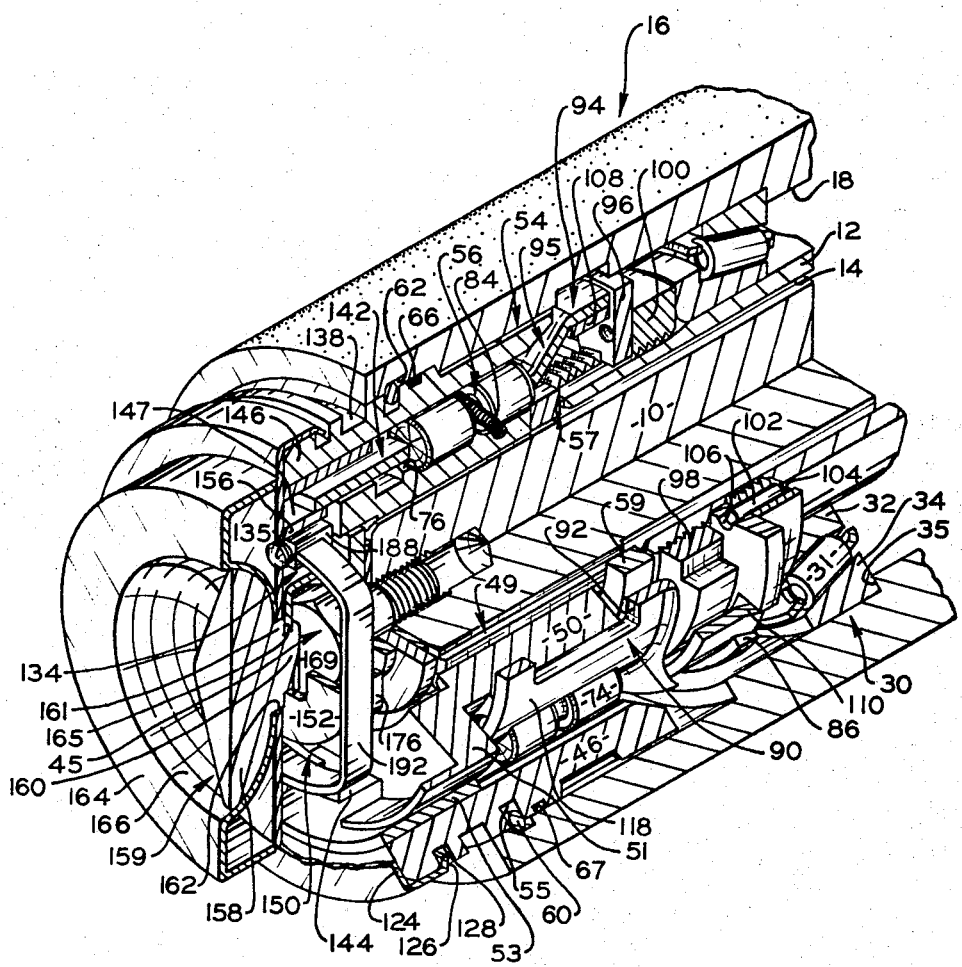
FIG. 3 is a partial perspective view of the device of FIG. 1 with a portion cut away to show the internal structure.

Referring more particularly to the drawings, and specifically to FIGS. 1–3, a power shaft or axle shaft 10 of a vehicle (not shown) is mounted so as to extend into a wheel bearing spindle 12; the wheel bearing spindle 12 being non-rotationally carried by the vehicle (not shown) and provided with a bore 14 of sufficient diameter so that the axle shaft 10 is free to rotate therein. A bushing 15 at the inboard or rightward end of the bearing spindle aids in aligning the spindle relative to the axle and supports the axle 10 for the aforesaid rotation. Mounted radially outwardly from the spindle 12 is a front wheel hub assembly 16 provided with a bore 18 so as to peripherally surround the spindle 12 and axle 10. The wheel hub 16 includes a radially extending attaching rim 20 adapted for fixedly mounting the front wheel of a vehicle (not shown).

The hub 16 is mounted for free rotation on the spindle 12 intermediate its ends by a conventional outboard tapered roller bearing assembly 30, including a plurality of tapered rollers 31 disposed between inner and outer races 32 and 34 and, at its inboard end by, a conventional tapered roller bearing assembly 36 including a plurality of tapered rollers 37 disposed between inner and outer races 38 and 40, with the inner races 32 and 38 attached to the spindle by being slip-fit thereto, the race 38 also abutting a shoulder 39 integral with the spindle 12 and the race 32 abutting a locking nut 100 screwingly attached to the spindle 12. The outer race 34 abuts against a shoulder 35 integral with the hub and the outer race 40 also abuts against shoulder 41 integral with the hub. Thus, the inner and outer races 32, 34 and the inner and outer races 38 and 40 are prevented from relative separating movement therebetween by their abutment with the respective shoulders and retaining nut, while each of the plurality of rollers 31 and 37 disposed between the inner and outer races prevents relative movement of its engaging races towards each other.

A conventional leather or synthetic sealing ring 42 is positioned at the inboard end 44 of the hub 16 and extends between the hub 16 and spindle 12, rotatably engaging the latter, to completely seal the rear end of the device against the intrusion of dirt and prevent the escape of lubricant therefrom.

Disengaging and releasing means are provided between the hub 16 and axle shaft 10 to permit, alternately, free wheeling and driving engagement therebetween. This means comprises an outer race 46 fixed to the hub, an inner race 50 fixed to the axle shaft and a roller engaging means 56 floatingly mounted therebetween to drivingly engage or disengage the inner and outer clutch races.

The inner race 50 is non-rotationally fixed to the axle shaft 10 which extends axially outwardly to the left beyond the wheel bearing spindle 12 to provide for splined attachment 49 of the inner race 50 for a substantial portion of the race's length to prevent relative rotational movement therebetween. A spacer ring 59 mounted inboard from the race 50 on the axle 10 limits rightward axial movement of the race by abutment of the ring 59 with a shoulder 57 that forms the left end of the spindle 12, the clearance between the spacer ring 59 and shoulder 57 permitting axial floating of the race 50. A shoulder 51, having a general L-shape with the upper arm of the L extending axially, is formed on the outboard end of the inner race 50 to center the race 50 axially by floating radial engagement with a bushing 53 disposed between it and the outer race. A bolt and ring assembly 45 on the outboard end of the axle shaft 10 limits leftward axial movement of the inner race 50. It can be seen (FIG. 1) that sufficient clearance is provided by this arrangement to permit the clutch race 50 to have limited axial and radial floating.

The outer race 46 is connected to the hub 16 at its inboard end by a splined connection 54 therebetween that prevents relative rotation of these two members. Means is provided for permitting limited axial movement of outer race 46 and includes a groove 55 extending annularly around the outer clutch race 46, mediate the ends of the race, for the seating of a snap ring 60. The snap ring 60 extends outwardly radially beyond the clutch race and is disposed in an annular groove 62 formed in the wheel hub 16, with the groove 62 of sufficient width so that the snap ring 60 and outer clutch 46 have limited axial floating movement relative to the hub 16.

The roller engaging means 56, as set forth previously, is disposed between the inner and outer clutch races and includes a series of rollers 74 that are circumferentially spaced around the inner clutch 50 by an annular bearing cage 90 having a series of roller retaining slots 92 in a roller bearing portion 118 of the cage in which the rollers 74 are disposed. Each of the slots 92 are of sufficient size to provide clearance on all sides of a roller 74, permitting the rollers 74 to float slightly axially and radially relative to the cage 90 and thereby relative to the inner and outer races 50, 46.

As best seen in FIGS. 1–5, the outer and inner races 46 and 50 are concentrically arranged and extend axially and have opposed generally cylindrical surfaces 70 and 72, respectively, over the right portion thereof. The cylindrical surface 72 of the inner race 50 is interrupted by a plurality of circumferentially spaced and axially extending groove means 78 formed in the inner race. Each groove means 78 has a central groove 76 at the deepest portion thereof, which central groove is circumferentially bounded by a pair of grooves 80 and 81 that extend from the central groove to the cylindrical surface 72. Each of the grooves 76, 80 and 81, when viewed in cross-section, are of the same radius of curvature; the center of curvature of the central groove 76 lying on a radius of the cylindrical surface 72 and radially outwardly of the surface 72 while the center of curvature of the grooves 80 and 81 are spaced radially outwardly from the center of the central groove 76 and displaced counterclockwise and clockwise, respectively, from the center.

Figure 4:
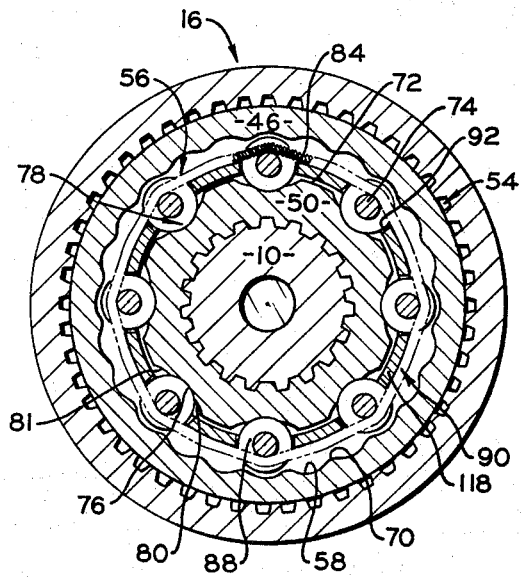
FIG. 4 is a sectional view taken on line 4—4 of FIG. 1 showing the clutch in disengaged position.

As seen in FIG. 4, an axially elongated roller 74, in the disengaged position of the clutch means 56, is disposed so as to contact each of the central grooves 76 and each has a radius which is the same as the generating radius for the central groove 76 so that the surface of the central groove is fully contacted by the roller 74 and the radially outer periphery of the roller projects beyond the surface of the inner race 50. The roller 74 is adapted to be cammed up the sides of the central groove 76 and into the groove 80 or 81 at which time the roller's axes will be coaxial with the generating centers of the particular groove 80 or 81 in which it is received and the roller 74 will be displaced radially outwardly from the position formerly assumed when in the central groove 76.

The cylindrical internal surface 70 of the outer race 46 is interrupted by a plurality of axially extending circumferentially spaced grooves 58 with the arc radius of the grooves being approximately the same dimension as the radius of the rollers 74 and the generating centers of each of the grooves lying on an imaginary cylinder defined by the axes of the rollers 74 when the latter are in the grooves 80 or 81.

The depth of the central grooves 76 is such that when the rollers 74 are fully disposed therein the periphery of the rollers will be spaced radially inwardly from the cylindrical surface 70 in the outer race 46 while the depth of the grooves 80 and 81 is such that when the rollers 74 are disposed therein the radially outer periphery thereof will extend beyond the cylindrical surface 70 and the rollers will be in full engagement with the groove 58 in the outer race 46. Accordingly, when the rollers 74 are in the central groove 76, the outer race 46 may freely rotate relative to the inner race. When, as viewed in FIG. 5, the inner race is rotating in a counterclockwise direction and with the rollers disposed in the groove 81 in the inner race and the groove 58 in the outer race, the outer race will be driven in a counterclockwise direction by the inner race; however, if the outer race over-runs the inner race in the counterclockwise direction, the rollers 74 will be urged counterclockwise direction from the grooves 81 and into the central grooves 76 so that the outer race may freely over-run the inner race in a counterclockwise direction.

When the inner race 50 is rotating in a clockwise direction and each of the rollers 74 is disposed in a groove 80 in the inner race and a groove 58 in the outer race, the outer race 46 is driven in a clockwise direction. If the outer race over-runs the inner race in the clockwise direction, the rollers 74 will be urged clockwise from the grooves 80 into the central grooves 76 so that the outer race may freely over-run the inner race in a clockwise direction.

Resilient means are provided for urging the rollers 74 radially inwardly and takes the form of an annular coil or garter spring 84. The rollers 74 are provided with an annular groove 88 axially intermediate its ends and the spring 84 extends about the rollers through the radially outer portion of the grooves in the rollers, the grooves 88 being of sufficient depth to displace the spring 84 inwardly of the periphery of the rollers 74, and, since the spring is stressed in tension, the same urges the rollers radially inwardly and maintains the same in the central groove until such time as they are urged radially outwardly therefrom.

In order to actuate automatic engagement between the inner and outer races (i.e., outward movement of the rollers to the FIG. 5 position) a first arresting means 94 is utilized. This means includes an axially rightwardly extending flared extension 95 on the cage 90, the extension being axially displaced rightwardly beyond the inner and outer clutch races for mounting a C-shaped engaging ring 108. The flared extension 95 includes an angled portion 114 that extends angularly outwardly relative to the axial direction and a portion 116 joined thereto which is annular in shape and co-axial with and radially displaced outwardly from the roller bearing portion 118 of the cage 90 by the anged portion 114. The C-shaped ring 108, in free state, is generally annular in shape and takes the form of an expanded split ring having an axially extending tang 110. The ring 108 is mounted within the portion 116 by diametrically compressing the ring 108 so that the ends of the ring nearly meet, with the outer circumferential periphery of the ring bearing against the inner circumferetial periphery of the portion 116 to provide a resilient pressing engagement therebetween.

In the compressed assembled position the inner peripheral surface of the C-shaped ring 108 extends beyond and is spaced radially outwardly from a locking nut 98 so that there is no interference therewith and the cage 90, at this end, is free to float axially.

A retaining ring 96 is fixedly mounted on the spindle 12 between the locking nut 98 and the locking nut 100. Both of these nuts being screwingly attached to the spindle with the locking nut 100 being disposed inboard of the ring 96 and the locking nut 98 being outboard of the ring 96. Axial movement of the ring 96 is prevented by close abutting engagement of its opposite faces with the nuts 98 and 100, while rotational movemental of the ring 96 is prevented by a pin 102 mounted in an aligned aperture 104 in locking nut 100 and an aligned aperture 106 in the retaining ring 96. The ring 96 extends radially outwardly relative to the locking nuts 98 and 100 and is provided with an axially extending notch 86, extending from face to face in the ring for mounted insertion of the tang 110 to thereby arrest relative rotation between the C-shaped ring and the spindle 12. As illustrated, the tang 110 of the C-shaped spring is disposed at a slight angle axially to the right and radially outwardly relative to the outward axial portion 116 of the cage to provide additional radial clearance between the brake ring 108 and the retaining ring 96 upon leftward shifting of the cage 90 and brake ring 108.

Thus, upon rotation of the shaft 10 relative to the hub 16, the arresting means 94 through a resilient frictional engagement between extending portion 116 of the cage and the C-shaped ring 108 inhibits rotating movement of the roller cage 90 and acts in a trigger fashion so that as the inner clutch race 50 rotates relative thereto it urges the rollers 74 outwardly into engagement between the inner and outer clutch race 50, 46. After such engagement, the rollers and cage 90 rotate with the inner and outer races accompanied by resilient frictional slipping between the portion 116 and the ring 108.

A cover assembly 124 is mounted on an extreme leftward end 146 of the outer race 46, this outer end extending beyond the hub 16, and is held to the outer race by a retaining lip 126 that is spun into an annular groove 128 extending completely around the outer clutch race 46 and, the cover assembly, in conjunction with an O-ring 66, disposed in an annular groove 67 in the periphery of the outer race and engaging the inner surface of the hub, seals the left hand end of the assembly. The cover assembly 124 includes an eccentrically disposed aperture 132 therein for mounting a pin 134 which is inserted in the aperture so as to extend axially rightwardly from the cover assembly and the head 135 of the pin is peened over for fixedly attaching the pin 134 to the cover assembly 124. An annular groove 138, provided in the outer periphery of the race member 46, is axially disposed intermediate the grooves 58 and 128 and is utilized as a lodgement for a screw driver for prying to thereby disassemble the outer race 46 from the wheel hub 16, if desired. It should be noted that the left side of the groove 62 is angled axially inwardly and radially outwardly relative to the bore of the hub 16, so that snap ring 60 is cammed radially inwardly as the race is moved leftwardly to allow such disassembly.

The cover assembly 124 also includes a mounting member 164, fixedly attached thereto by welding or the like, which is generally circular in shape and includes a dished portion 166 having a concave surface for nesting engagement with the complementary shape of a knob 158, the knob forming a portion of the manual actuating means 159. The dished portion 166 is sufficiently deep to fully accommodate the knob 158 so that no accidental turning or breaking of the knob 158 can occur. A central aperture 162 in the cover assembly 124 provides for insertion of the knob 158.

The manual actuating means 159 also includes an axially extending portion 161, integral with the knob 158, having a generally circular shape. The portion 161 extends through the aperture 162 in the cover assembly 124 and terminates at the internal peripheral surface of the mounting member 164 to provide a flat end face 165. Formed integrally with the extending portion 161 is a stub 160, the rightwardly extending end 167 of which is generally square in cross-section with rounded corners 163 for mating engagement with a similarly shaped aperture 169 in an actuating cam 152. The right end of the stub 160 is peened over so as to prevent rightward movement of the actuating cam 152, while the flat end face 165 on the extending portion 161 of the knob 158 prevents leftward movement of the cam 152. As can be seen in FIG. 1, the left side of the cam 152 also abuts against the cover assembly 124 to prevent leftward movement of the assembled knob 158 and cam 152. Further, the peripheral shape of the knob 158 which abuts against the dished portion 166 conforms generally thereto so that rightward movement of the assembled knob and cam is prevented. It can be seen, therefore, that the knob 158 and cam 152 are mounted so as to be easily turned while, at the same time, limited in axial movement.

Figure 6:
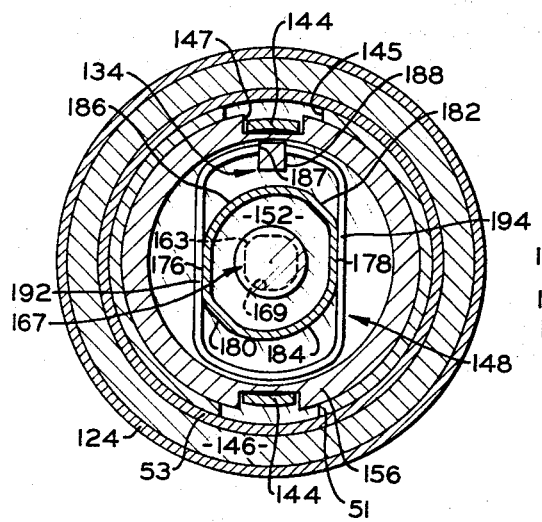
FIG. 6 is a cross-sectional view of the device taken generally on line 6—6 of FIG. 1.

The cam 152 has a general dish shape in longitudinal cross-section with the periphery thereof inwardly disposed radially relative to the cage 90. In elevation the outer periphery of the cam 152 can be seen (FIG. 6) as formed by two long vertically extending sides 176, 178, the side 176 terminating downwardly in angled straight side 180 and the side 178 terminating upwardly in angled straight side 182. Curved sides 184 and 186 complete the outer periphery of the cam 152, the curved sides 184, 186 of the cam providing engaging surfaces which, because of the smooth curve furnished thereby, make the knob 158 easily turnable.

A second arresting means 150, which is manually actuated, is disposed at the outboard end 146 of the assembly but axially inwardly from the cover assembly 124. This means includes an axially leftwardly extending portion 142 on cage 90 having diametrically opposed tangs 144 extending therefrom. Clearance for passage of the tangs 144 through shoulders 51 on the inner clutch races is provided by diametrically opposed axially extending notches 145 whose axial length includes the entire axially extending arm of the L-shaped shoulder 51, and whose depth extends into the other arm of the L-shaped shoulder 51, each of the said notches 145 being of sufficient width and depth for radial and axial movement of the tangs 144. A friction ring 156 of generally annular shape is disposed radially inwardly of the shoulder 51 and has a pair of diametrically opposed notches 147 in its outer periphery which mate with the tangs 144 so that the friction ring is mounted for rotational movement with the cage 90. The notches 147 are slightly radially and circumferentially spaced from the tangs 144 to allow for float therebetween. A friction spring 148 is mounted radially inwardly from the friction ring 156 with sufficient clearance therebetween, with the spring 148 in its disengaged position, so that the ring 148 is free to float radially. The friction spring 148, in free state, is formed from a generally egg shaped resilient ring with long straight sides 192 and 194. The spring is then split intermediate the long straight sides at its top portion and the spring is resiliently deformed so that its ends 187, 187 are spaced and placed in compressive abutting engagement with the straight parallel sides 188, 188 of an inwardly extending portion 190 of the fixed pin 134. In such position, the straight sides 192, 194 of the spring 148 lightly resiliently abut against the straight sides 176, 178 of the cam 152, but the spring 148, as set out previously, does not engage the ring 156 and thereby has a limited amount of floating movement.

Figure 5:
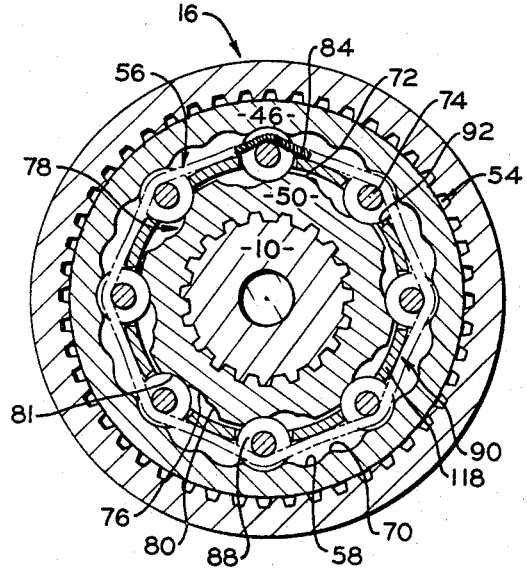
FIG. 5 is a view similar to FIG. 4, but showing the clutch in engaged position.
Figure 7:
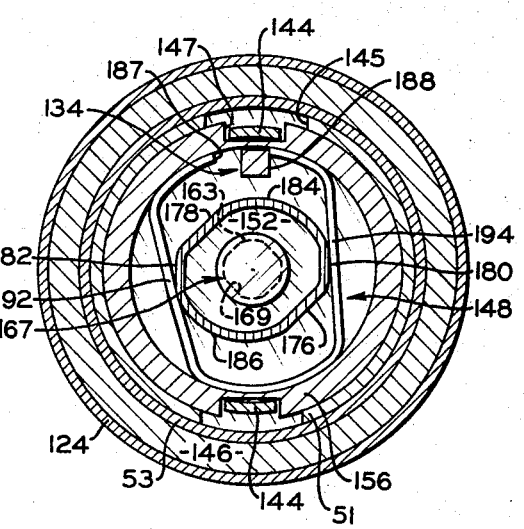
FIG. 7 is a cross-sectional view of the device similar to FIG. 6, but showing the manually actuated arresting means in engaged position.

As can be seen in FIG. 7 when the cam 152 is rotated approximately 135° in counterclockwise direction the ends 187, 187 of the spring are forcing outwardly expanding the spring outwardly and downwardly so that the curved periphery of the spring 148 intermediate the sides 192 and 194 thereof frictionally engages the ring 156 to thereby arrest rotation between the roller cage 90 and the hub 16. Thus, in the event that the hub 16 overrides the inner race 50 and with the spring 148 in engaged position, the roller cage 90 is carried with the hub 16 and each of the rollers 74 is cammed outwardly by the groove 76 to engage between one of the outer grooves 80, 81 in the inner race and a groove 58 in the outer race to thereby couple the shaft 10 and the hub 16 in driving relationship. With the spring 148 in this engaged position, the roller cage 90 rotates with the outer race 46 and overrunning is prevented. For example, assume that the inner race 50 is rotating in counterclockwise direction, driven by the axle shaft 10 and the rollers 74 are disposed in the grooves 81 (FIG. 5). If the hub 16 and outer race 46 tend to overrun in the counterclockwise direction, the rollers 74, carried by the cage 90, will move with the outer race 46 and move from the grooves 81 into the central grooves 76 and then into the grooves 80 thereby again placing the inner and outer races in engaged relationship.

A description of the overall invention is now given. Under automatic operation, with the friction spring 148 disengaged from the friction ring 156, the vehicle transfer case is placed in four wheel drive so that drive is transmitted to the axle shaft 10. This causes the axle shaft 10 and the inner race 50 to rotate, at the same time the roller cage 90 and the rollers 74 are momentarily held against rotation by the resilient frictional engagement of the C-shaped brake ring 108 with the roller cage 90, the brake ring being held stationary by its tang 110 engaging with the groove 86. Since the rollers are held against rotation relative to the inner race, the rollers 74 are forced outwardly as the inner race slightly rotates, moving the rollers from a position in the central grooves 76 to a position in the outer grooves 80 or 81, dependent on the direction of the drive. As previously set out, a portion of the peripheral surface of each roller 74 is thereby engaged by the surface of the outer groove 80 or 81 in the inner race and a portion of the surface of the groove in the outer race 46, placing the inner and outer races in driving relation. Since the outer race is splined to the hub 16, such engagement clutches the hub 16 to the shaft 10.

If manual operating locking operation is desired so as to insure no overrunning and positive driving engagement of the front wheels at all times, the knob 158 is turned substantially 135° from a disengaged to an engaged position forcing the friction spring 148 into engagement with the friction ring 156 thus preventing rotation of the roller engaging means 56 relative to the hub 16. Upon attempted overrun of the hub 16 or upon initiation of driving the inner race 50, relative rotation will occur between the cage 90 and the inner race 50 so that the rollers 74 are forced into the outer groove 80 or 81 of the inner race thereby engaging the inner and outer races 50, 46 respectively, the first arresting means 94 being overridden and rotation occurring between the cage 90 and the C-shaped ring 108. Since the manual means remains in locked position until manually readjusted, attempted overrunning of the wheels is not possible because the friction ring 156 and the roller cage 90 is held in non-rotational position relative to the hub 16 at all times.

It should be clear from the foregoing description that the objects of the invention have been fully obtained by the apparatus described and that a clutch having both manual and automatic positive clutching and declutching characteristics is provided.

While only a single embodiment of this invention has been shown and described, it is understood that many changes can be made therein without departing from the scope of this invention as defined by the following claims.

What is claimed is:

1. A clutch for drivingly connecting and disconnecting a driving and driven member comprising in combination, (a) a stationary member disposed adjacent said members and supporting the same for coaxial rotation, (b) said members including coaxial and spaced surface means, (c) engaging means disposed between said surface means and in constant engagement with said driving member, (d) embracing means embracing said engaging means and including friction means connecting the same to said stationary member for frictionally inhibiting relative rotation therebetween, (e) said embracing means maintaining said engaging means in constant engagement with said surface means on said driving member and urging said engaging means away from said driven means, said embracing means being axially and radially floatingly mounted relative to said driven member and said satisfactory member, (f) manually operable means for selectively connecting and disconnecting said embracing means to said driven member for inhibiting relative rotation therebetween, (g) said surface means on said driving member having circumferentially spaced camming and wedging means thereon for camming said engaging means towards said driven member against the urging of said embracing means and wedging said engaging means between said driving and driven members upon relative rotation of said driving member and said engaging means, (h) said camming and wedging means being spaced on both circumferential sides of said engaging means for camming said engaging means towards said driven member and wedging it thereagainst upon rotation of said driving member relative to said engaging means in either direction of rotation, (i) said friction means being a first friction means and (j) said manually operable means including a resilient second friction means and a manually manipulatable means for resiliently deforming said second friction means for selectively connecting and disconnecting said embracing means to said member and frictionally inhibiting relative rotation therebetween.

2. A clutch for connecting and disconnecting a shaft member and a hub member having; (a) an inner race fiexd to said shaft member, (b) an outer race fixed to said hub member, (c) a roller engaging means disposed between said inner and outer races, (d) means mounting said engaging means for axial and radial floating movement relative to said inner and outer races, (e) said mounting means including an arresting means contacting said engaging means for momentarily inhibiting movement of said engaging means (f) a camming means mounted on said inner race for positioning said engaging means in driving relation with said inner and outer races, (g) a fixed spindle member extending into said hub member, (h) means mounting said arresting means to said fixed spindle member for axial and radial floating movement relative thereto, (i) a resilient ring like means frictionally abutting said roller engaging means, (i) said resilient ring like means positively engaging a portion of said mounting means for said arresting means to prevent relative rotation therebetween, (k) whereby upon initial rotation of said inner race relative to said engaging means, said engaging means aligns with said inner and outer races and positively couples said shaft member and said hub member in driving engagement.

3. A clutch for connecting and disconnecting a shaft member and a hub member having; (a) an inner race fixed to said shaft member, (b) an outer race fixed to said hub member, (c) an engaging means disposed between said inner and outer races, (d) means mounting said engaging means for axial and radial floating movement relative to said inner and outer races, (e) said mounting means including an arresting means contacting said engaging means for momentarily inhibiting movement of said engaging means, (f) a camming means mounted on said inner race for positioning said engaging means in driving relation with said inner and outer races, (g) a fixed spindle member extending into said hub member, (h) means mounting said arresting means to said fixed spindle member for axial and radial floating movement relative thereto, (i) said arresting means includes (1) a resilient ring like means frictionally abutting said engaging means, said resilient ring like means partially encompassing said spindle member and radially spaced therefrom (2) notch means fixed relative to said spindle, and, (3) projecting means on said ring like means for extending into said notch means, (j) whereby upon initial rotation of said inner race relative to said engaging means, said engaging means aligns with said inner and outer races and positively couples said shaft member and said hub member in driving engagement.

4. A clutch for drivingly connecting and disconnecting a driving and driven member, the combination including; (a) a stationary member disposed adjacent said members and supporting the same for coaxial rotation, (b) said members including coaxial and spaced surface means, (c) a roller engaging means disposed between said surface means, (d) said surface means on said driving member including a first and second series of arcuate inner grooves, said second series of inner arcuate grooves being disposed radially outwardly from said first series, each of said inner grooves in said first series having an inner groove of said second series disposed on opposite sides thereof, each of said grooves on said first series and each of said grooves on said second series having the same radius of curvature, (e) said surface means on said driven member including a series of outer arcuate grooves disposed in general confronting relationship with said first and second series of inner arcuate grooves, each of said outer grooves having the same radius of curvature as said inner grooves in said first and second series, (f) said rollers engaging means including a plurality of rollers disposed between said surfaces and circumferentially spaced around said surface on said driving means, (g) said rollers seating in said first series of inner grooves and spacedly displaced from said series of outer grooves when said clutch is in disengaged position, said rollers seated in said second series of inner grooves and said outer series of grooves when said clutch is in engaged position, (h) arresting means mounted on one of said stationary and driven members for inhibiting rotation of said roller engaging means relative to said driving member to engage said clutch, (i) whereby surface to surface contact between said spaced surface means and said rollers is obtained for positive driving engagement between said driving and driven members.

5. A clutch as described in claim 2 wherein said roller engaging means includes a plurality of circumferentially spaced rollable members and an embracing means including a resilient means engages said rollable members to urge them towards said inner race fixed to said shaft member.

6. A clutch as described in claim 5 wherein said plurality of circumferentially spaced rollable members urged radially inwardly by a resilient band like member comprising the last mentioned resilient means, the said resilient band like member being disposed in circumferentially extending notch like portions in said rollable members.

7. A clutch according to claim 2 wherein said roller engaging means includes an embracing means for maintaining said roller engaging means in constant engagement with said inner race fixed to said shaft member and urging said engaging means away from said outer race fixed to said hub member.

8. A clutch according to claim 7 wherein said inner race fixed to said shaft member has circumferentially spaced camming and wedging means thereon for camming said roller engaging means towards said hub member against the urging of said embracing means and wedging said engaging means between said shaft member and said hub member upon relative rotation of said shaft member and said roller engaging means.

9. A clutch according to claim 8 wherein said camming and wedging means are spaced on both circumferential sides of portions of said roller engaging means for camming said portions of said engaging means towards said hub member and wedging them thereagainst upon rotation of said shaft member relative to said roller engaging means in either direction of rotation.

10. A clutch as described in claim 2 wherein a manually manipulatable means is provided for selectively connecting and disconnecting said roller engaging means from said hub.

11. A clutch according to claim 3 wherein a manually manipulatable means is provided for selectively connecting and disconnecting said engaging means to said hub.

12. A clutch according to claim 3 wherein said engaging means includes an embracing means for maintaining said engaging means in constant engagement with said inner race fixed to said shaft member and urging said engaging means away from said outer race fixed to said hub member.

13. A clutch according to claim 12 wherein a manually manipulatable means is provided for selectively connecting and disconnecting said engaging means from said hub.

14. A clutch according to claim 12 wherein said inner race fixed to said shaft member has circumferentially spaced camming and wedging means thereon for camming said engaging means towards said hub member against the urging of said embracing means and wedging said engaging means between said shaft member and said hub member upon relative rotation of said shaft member and said engaging means.

References Cited

UNITED STATES PATENTS

| | | | |
|---|---|---|---|
| 2,232,090 | 2/1941 | Anderson | 192—45 |
| 2,860,750 | 11/1958 | Avanzati | 192—44 |
| 3,055,471 | 9/1962 | Warn et al. | 192—38 |
| 3,324,744 | 6/1967 | Roper | 192—44 |

BENJAMIN W. WYCHE III, *Primary Examiner.*

L. J. PAYNE, *Assistant Examiner.*